United States Patent [19]

Truninger

[11] 4,427,170
[45] Jan. 24, 1984

[54] CABLE HOLDER HAVING RELATIVELY ROTATABLE PARTS

[75] Inventor: Thomas Truninger, Zurich, Switzerland

[73] Assignee: Adna Aktiengesellschaft, Vaduz, Liechtenstein

[21] Appl. No.: 377,189

[22] Filed: May 11, 1982

[30] Foreign Application Priority Data

May 13, 1981 [CH] Switzerland .................. 3109/81

[51] Int. Cl.³ .............................. F16L 3/00
[52] U.S. Cl. .............................. 248/51; 174/86
[58] Field of Search .............. 248/51, 53; 174/86; 339/119 C, 5 RL, 6 RL, 8 RL; 191/12 R; 285/272

[56] References Cited

U.S. PATENT DOCUMENTS 3,836,430  9/1974  Frisch et al. ................ 248/51
4,129,277  12/1978  Tenniswood ................ 248/51
4,330,368  5/1982  Larson et al. ................ 248/51

*Primary Examiner*—William H. Schultz
*Assistant Examiner*—Ramón O. Ramirez
*Attorney, Agent, or Firm*—Watson, Cole, Grindle & Watson

[57] ABSTRACT

A holder device for a flexible power supply cable includes coaxial, relatively rotatable sleeve members with the cable extending through an annular space defined between the inner wall of the rotatable members and a guide ring fixed to one of the members, the cable being affixed to both members which are capable of relative rotation without interference by the cable.

4 Claims, 3 Drawing Figures

CABLE HOLDER HAVING RELATIVELY ROTATABLE PARTS

BACKGROUND OF THE INVENTION

This invention relates generally to a device having relatively rotatable parts for holding a flexible power supply cable affixed thereto.

The relatively rotatable parts may comprise, for example, a stationary base and a relatively movable arm of a crane installation, or a movable part of a pneumatic conveyor, in which the power supply unit is located in the stationary base. Thus, all connections, such as electrical lines, hydraulic lines and/or air conveyor lines must be arranged between the stationary base and the moving part in such a manner as to not impede the relative turning movement. The lines must therefore follow the turning motion. For electrical conductors, turning movement can be facilitated by the provision of slip rings for power transfer in a purely electrical power transmission. Such an arrangement, however, requires special designs and is therefore costly. For hydraulic lines and for air conveyor lines, still other solutions must be found.

SUMMARY OF THE INVENTION

It is therefore an object of the present invention to provide a cost-effective solution to the problem in arranging power supply lines between stationary and relatively movable parts of the holder, which may comprise machine parts, in such a manner as not to impede relative rotary movement.

The holder according to the invention includes a pair of sleeves having a common central axis with at least one of the sleeves being rotatable about such axis relative to the other. Spaced brackets mount the cable to the inner walls of the sleeves, and a guide ring on the stationary sleeve extends into the rotatable sleeve and defines a uniform annular space therewith. A pair of cable supports at opposite ends of the ring extend transversely into such annular space, one of these supports is arranged at one side of the bracket on the stationary sleeve and the other support is arranged at the other side of a vertical line through the bracket on the stationary sleeve. The cable forms a loop between the brackets in the annular space, the loop has a lower cable portion, an upper cable portion and an arc portion between the lower portion and the upper portion of the cable. The lower cable portion is supported on the one support. A variable length of the upper cable portion is supported on the other support whenever the bracket on the rotatable sleeve during its rotation is at the other side of the bracket on the stationary sleeve. The length of the lower portion and of the upper portion of the cable is increasing and decreasing respectively and vice-versa during rotation of the rotatable sleeve whereby the sum of the lengths of the lower portion and the upper portion is constant and equal to the required range of rotation. Thus, the sleeves may be relatively rotated without interference by the cable.

The holder according to the invention is simple and inexpensive to construct and is widely adaptable for a variety of uses in which power supply cables are installed between stationary and relatively rotatable parts. For example, the present holder may be made a part of a crane or a vacuum air conveyor, wherein not only a large number of electrical lines, but numerous hydraulic lines are all capable of being combined into a common cable which must be guided to devices located on movable machine parts.

Other objects, advantages and novel features of the invention will become more apparent from the following detailed description of the invention when taken in conjunction with the accompanying drawings.

DETAILED DESCRIPTION OF THE INVENTION

Figure 1:
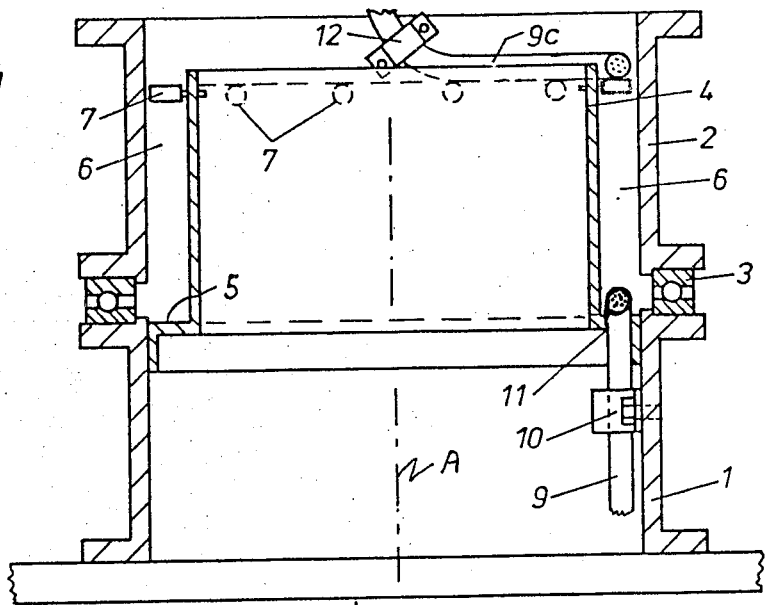
FIG. 1 is a schematic representation of a vertical cross-section of the holder embodying the invention, taken substantially along the line I—I of FIG. 2.

Turning now to the drawings wherein like reference characters refer to like and corresponding parts throughout the several views, the holder device shown in FIG. 1 comprises a stationary machine part 1 in the form of an upstanding sleeve mounted in place at one end, and a machine part 2 in the form of a sleeve which may have a like inner diameter stacked above the stationary sleeve and being rotatable relative thereto about a common central axis A. A roller bearing assembly 3 between the parts facilitates relative rotation.

A guide ring 4 is fixedly mounted on the inner wall of sleeve 1 near the upper end thereof, and extends into the movable sleeve. An annular flange 5 extends outwardly of the lower end of the ring so as to maintain an annular space 6 between the ring and the inner wall of sleeve 2.

Flange 5 also functions as a cable support as will be described in more detail hereinafter, and another cable support, in the form of a plurality of freely rotatable rollers 7, extend radially outwardly of ring 4 adjacent its upper end. As clearly seen in FIGS. 1 and 2, rollers 7 extend into annular space 6, and axes 8 thereof are spaced apart at equal angular distances and are distributed over about half the circumference of ring 4. These support rollers can be distributed over a more or less large portion of the circumference of guide ring 4, depending upon the required range of the angle of rotation of moving machine part 2 with respect to stationary machine part 1. And, instead of rollers, the upper cable support may be in the form of bars or plates extending into annular space 6.

A substantially flexible power supply cable 9 contains a plurality of lines (not shown in detail herein) such as electrical and/or hydraulic lines, which connect various supply devices (not shown) which supply electrical current and/or hydraulic oil to various consuming assemblies of equipment located on moving machine part 2. The group of lines combined into cable 9 is secured to stationary machine part 1 by a mounting device, such as a clamp 10, and the cable extends through a cable inlet opening 11 located in flange 5 of guide ring 4. Cable 9 extends from opening 11 as a loop in annular space 6 along a portion of the guide ring circumference. In the rotative position of sleeve 2 shown in FIGS. 2 and 3, a lower portion 9a of cable 9 extends from cable inlet opening 11 clockwise to a connecting arc portion 9b of the cable, which connects lower portion 9a with an upper portion 9c of the cable. The upper portion of cable 9 then extends counterclockwise along the upper edge of guide ring 4 and is supported on support rollers 7. The end of the upper portion of the cable is fixedly mounted on the inner wall of sleeve 2 by a mounting device, such as a clamp 12.

Figure 2:
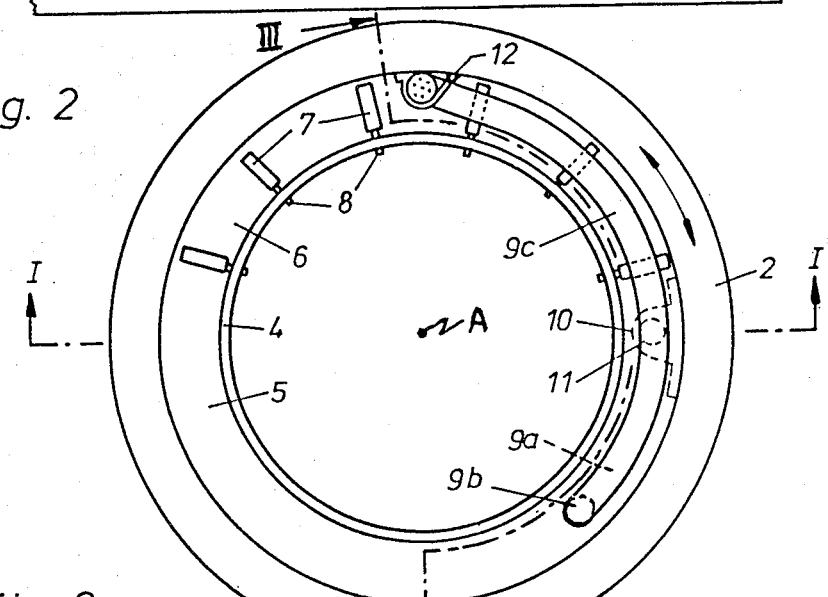
FIG. 2 is a top plan view of the holder shown in FIG. 1.

Between cable inlet opening 11 in flange 5 and the mounting location at 12 on rotatable part 2, the length of cable 9 is such that it forms, with respect to the distance of connecting arc portion 9b from cable inlet opening 11, a shorter or longer loop, when machine part 2 rotates in one or the other direction as depicted by the double arrow shown in FIG. 2. As the movable machine part 2 is rotated the upper bracket 12 and the connecting arc portion 9b of cable 9 travel in the same direction, but with different angular speeds. More particularly, the upper bracket 12 runs over a distance which always is twice the travel of the connecting arc portion 9b. Thus, for enabling the movable machine part 2 to be rotated throughout about 360° the loop of the cable must have a length such that the sum of the lower and upper cable portions 9a and 9c respectively, measures about half the circumference of the movable part 2.

When the movable part 2 is in one of its rotative end positions the cable loop has no lower horizontal portion 9a and the upper horizontal portion 9c of the cable is supported on the rollers 7 which are distributed over about half the circumference of ring 4.

When the movable part 2 is in the other of its rotative end positions the cable loop has no upper horizontal portion 9c and the cable 9 only rests on flange 5 of guide ring 4.

The movable machine part 2 is in a middle rotative position, if the cable mounting devices 10 and 12 are one above the other on a vertical line, and from this position machine part 2 can rotate throughout about 180° in one direction and throughout about 180° in an opposite direction (i.e., throughout about 360° from one to the other rotative end position.) The annular flange 5 which functions as a first cable support must extend over at least a part of the circumference of ring 4 beginning adjacent said cable mounting device 10 and extending to one side of the mounting device 10. The rotatable rollers 7 which are arranged axially spaced from the annular flange 5 of the ring 4 adjacent its upper end and which functions as a second cable support must be distributed over at least a part of the circumference of ring 4 with a first roller 7 near a vertical line extending through the cable mounting device 10 and with all rollers 7 lying to the other side of said line through the mounting device 10. A variable length of the upper cable portion 9c is supported on the rollers 7 whenever the cable mounting device 12 of the rotatable machine part 2 during its rotation is moving at the other side of the cable mounting device 10 of the stationary machine part 1. The upper cable portion 9c is not supported during rotation of the rotatable machine part 2 from the middle rotative position to one of the rotative end positions. During rotation the length of the lower portion and of the upper portion of the cable is increasing and decreasing respectively and vice-versa and the sum of the lengths of the lower portion and upper portion is constant and equal to the required range of rotation of the machine part 2.

Figure 3:
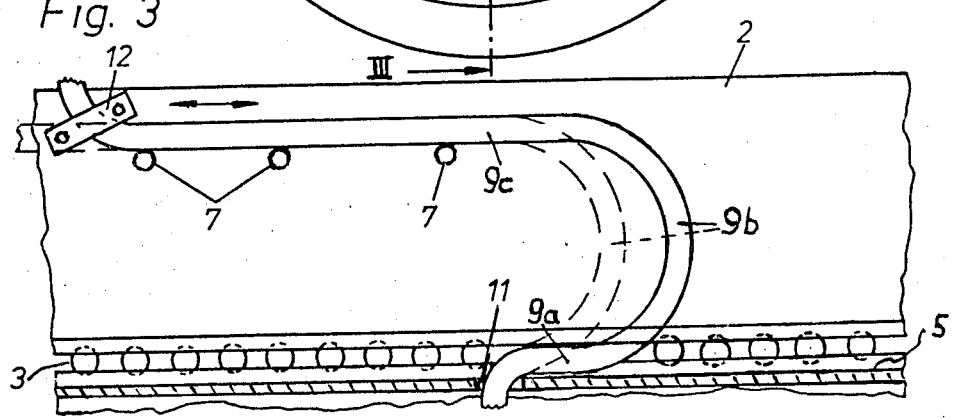
FIG. 3 is a developed view showing the cable as looped between the relatively movable parts, when viewed in the direction of arrows III—III of FIG. 2.

The developed view of movable machine part 2 in FIG. 3, as seen from the direction of arrows III—III of FIG. 2 and covering about half the circumference, clearly illustrates the manner in which cable 9 loops between opening 11 and mounting location 12 on sleeve 2. The loop is guided between rotatable machine part 2 and guide ring 4. In another rotative position of movable machine part 2, connecting arc portion 9b assumes a different position between bottom portion 9a and upper portion 9c, and is shown in dashed outline in FIG. 3.

From the foregoing, it can be seen that rotatable machine part or sleeve 2 may be rotated about central axis A relative to stationary machine part 1 without interference by cable 9 which extends through the holder device and is fixedly mounted to both machine parts by spaced clamps 10 and 12. Depending on the extent of the cable loop which lies within annular space 6 along the circumference of guide ring 4, sleeve 2 is capable of rotation to a corresponding extent in opposite directions relative to stationary part 1.

Obviously, many modifications and variations of the present invention are made possible in the light of the above teachings. It is therefore to be understood that within the scope of the appended claims the invention may be practiced otherwise than as specifically described.

What is claimed is:

1. A holder for a flexible power supply cable, comprising a pair of sleeves disposed end-to-end and having a common central axis, at least one of said sleeves being rotatable about said axis relative to the other, first and second means fixedly mounting the cable respectively on the inner walls of said sleeves, a guide ring mounted on said other sleeve and extending into said one sleeve, said guide ring defining a uniform annular space with said inner wall of said one sleeve, first cable support means on said guide ring extending transversely into said annular space over at least a part of the circumference of the ring at one side of said first cable mounting means on said other sleeve, and second cable support means on said guide ring being axially spaced from said first cable support means and extending transversely into said annular space over at least a part of the circumference of the ring at the other side of said first cable mounting means on said other sleeve; the cable forming a loop between said first and second mounting means in said annular space, said loop having a lower cable portion, an upper cable portion running parallel to said lower cable portion and an arc portion between said lower portion and said upper portion, said lower cable portion being supported on said first cable support means and a variable length of said upper cable portion being supported on said second support means whenever said second cable mounting means of said rotatable sleeve during rotation of said sleeve is at said other side of said first mounting means, the length of said lower portion and of said upper portion of the cable being increasing and decreasing respectively and vice-versa during rotation of said one sleeve with the sum of the lengths of said lower and upper portions respectively being constant and equal to the required range of rotation.

2. The holder according to claim 1, wherein said second support means comprise a plurality of spaced rollers.

3. The holder according to claim 1, wherein said first support means comprises a flange by which said ring is mounted on said other sleeve.

4. The holder according to claim 1, wherein said second support means extends to about one-half the circumference of said guide ring and wherein said one sleeve is rotatable throughout almost 360° with respect to said other sleeve.

* * * * *